(12) United States Patent
Arwald et al.

(10) Patent No.: US 7,212,543 B1
(45) Date of Patent: May 1, 2007

(54) METHOD, SYSTEM AND DEVICE FOR ESTABLISHING COMMUNICATION BETWEEN DIFFERENT COMMUNICATION NETWORKS

(75) Inventors: Jan Arwald, Sollentuna (SE); Stefan Hagbard, Lidingo (SE); Sten Andersson, Lund (SE); Margareta Erhult, Haninge (SE)

(73) Assignee: Teliasonera AB, Farsta (SE)

( * ) Notice: Subject to any disclaimer, the term of this patent is extended or adjusted under 35 U.S.C. 154(b) by 0 days.

(21) Appl. No.: 09/806,484

(22) PCT Filed: Oct. 11, 1999

(86) PCT No.: PCT/SE99/01830

§ 371 (c)(1),
(2), (4) Date: Jun. 20, 2001

(87) PCT Pub. No.: WO00/22789

PCT Pub. Date: Apr. 20, 2000

Related U.S. Application Data (60) Provisional application No. 60/141,003, filed on Jun. 29, 1999, provisional application No. 60/141,002, filed on Jun. 29, 1999.

(30) Foreign Application Priority Data

Oct. 12, 1998 (SE) .................................... 9803503

(51) Int. Cl.
*H04J 3/16* (2006.01)
(52) U.S. Cl. ................................................. 370/466
(58) Field of Classification Search ........ 370/352–356, 370/466–467, 428, 328, 401, 395.5
See application file for complete search history.

(56) References Cited

U.S. PATENT DOCUMENTS

| 5,239,662 A | * | 8/1993 | Danielson et al. .......... 709/246 |
| 5,586,117 A | * | 12/1996 | Edem et al. ................. 370/466 |
| 5,691,984 A | | 11/1997 | Gardner et al. |
| 5,901,352 A | * | 5/1999 | St-Pierre et al. .......... 455/426.1 |

(Continued)

FOREIGN PATENT DOCUMENTS

EP          0 758 824          2/1997

(Continued)

*Primary Examiner*—Chau Nguyen
*Assistant Examiner*—Christopher Grey
(74) *Attorney, Agent, or Firm*—Oblon, Spivak, McClelland, Maier & Neustadt, P.C.

(57) ABSTRACT

A method, system and device for communication establishes communications sessions between otherwise incompatible communication networks. A central unit is used to facilitate communication systems between objects, by referring to a database of communication attributes associated with different communication networks used by a calling part and a called party. Rather than have direct connections from one communication network to a next communication network, and having unique translators to support such direct connections, each of the communications is directed to a central facility, that identifies common protocols that are supported by the different communication networks to be employed when establishing a communication session between a first communication network and a second communication network. Included at the central facility is a database having subscriber information, and a network number associated with a subscriber, where the network number has associated therewith different communication numbers assigned to that subscriber in the different communication networks at which the subscriber may be located.

37 Claims, 6 Drawing Sheets

U.S. PATENT DOCUMENTS 6,014,440 A * 1/2000 Melkild et al. ............. 379/269
6,058,115 A * 5/2000 Sawyer et al. .............. 370/401
6,343,083 B1 * 1/2002 Mendelson et al. ......... 370/466
6,445,716 B1 * 9/2002 Favichia et al. ............ 370/466

FOREIGN PATENT DOCUMENTS

WO    WO 98/37724   *   2/1998
WO    WO 98/37724     8/1998

* cited by examiner

Background art

METHOD, SYSTEM AND DEVICE FOR ESTABLISHING COMMUNICATION BETWEEN DIFFERENT COMMUNICATION NETWORKS

CROSS-REFERENCE TO RELATED APPLICATIONS

The present document contains subject matter related to that disclosed in two copending, commonly owned patent applications, the first of which being entitled "Device and Method for Simplified Management of Services in a Communications Network", filed on the same day as the present application having as inventorship Nyckelgard et al, and bearing Provisional Application No. 60/141,003 filed Jun. 29, 1999, and a second application entitled "Communications Network Service Management Method and Device", being commonly owned and filed on the same day as the present document, having as inventorship Nyckelgard et al, and bearing Provisional Application No. 60/141,002 filed Jun. 29, 1999, the contents of both of which being incorporated herein by reference.

BACKGROUND OF THE INVENTION

1. Field of the Invention

The present invention is directed to methods and devices for enabling communication between different communication networks. More particularly, the present invention is directed to devices, switches, central facilities, and distributed facilities that at least partially, if not completely, establish communication linkage and coordination between different communication networks, including global telephone communication networks, normal telephony communication networks, proprietary data networks, Internet, and electrical distribution networks, for example.

2. Discussion of the Background

Figure 1:
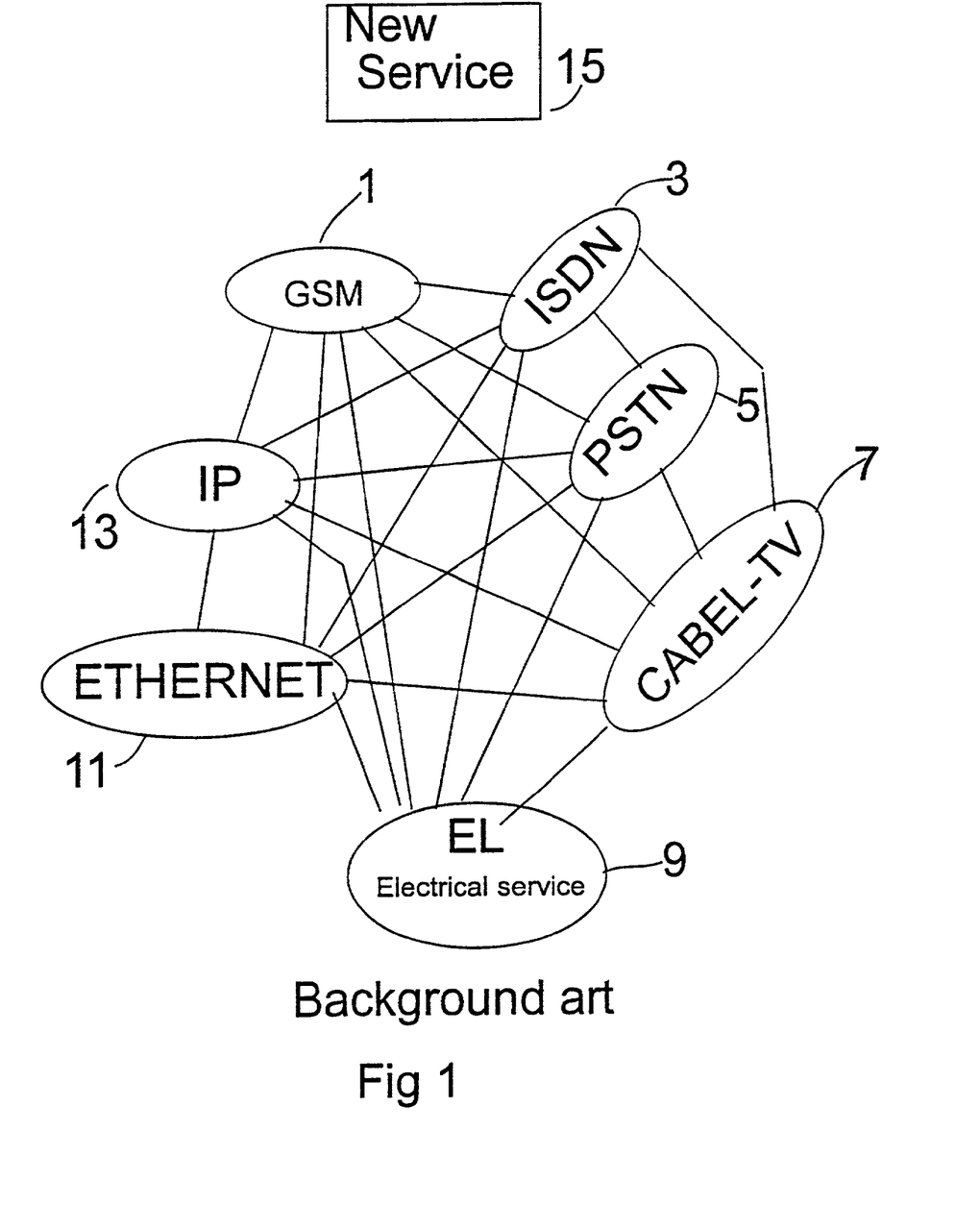
FIG. 1 is a diagram showing a conventional, evolutionary approach towards establishing communication links between existing networks.

During the information age, communication services and the infrastructure for providing communications has become a commodity. As the information age progresses, significantly more communication services are offered in various forms, each of which having various attributes and servicing different niche audiences. While in most countries the communication infrastructure, at least for telephony, has been established at one time or another by way of a government corporation, or government condoned monopoly, at least at some basic level telephony-based networks are somewhat compatible. However, as more services become available, such as cable television, wireless satellite links, proprietary wireless local loop, Internet and other terrestrial-based networks. These are an increasing number of protocols and physical components needed to support those services. To the extent it is possible for the different communication networks to provide and share information between the different networks, perhaps by way of a caller request, or data message sent from one network to the next, the burden is on each of the different networks to provide a customized connection to the other networks. This is illustrated in FIG. 1, where it is seen that different networks, such as GSM 1, ISDN 3, public switch telephone network (PSTN) 5, cable-TV 7, electrical service 9, Ethernet, 11, and Internet protocol (IP) 13 network each provide individual connections between themselves in a "spaghetti-like" fashion. Consequently, in order to provide connections between the respective networks, the network connections are made directly, thus requiring many translation devices and adapters for each network.

As presently recognized, a limitation with this point-to-point interconnection approach for existing network services, is that every time a connection is required between the different networks, every network must be provided with a new adapter so as to be compatible with the new network. Adding the adapter is a straightforward process from a planning perspective, but implementation is very difficult and cost increases significantly every time a new service is brought on line. Furthermore, such a system provides a barrier-to-entry for smaller proprietary networks that may ultimately bear the burden of funding the expense of updating the adapters for other existing communication systems.

Within the telecommunications world there are operators who have long offered telecommunication services within limited geographical areas. However, there are also new telecommunication operators, and other operators that provide an opportunity to provide telecommunications and other communication services which may be compatible, or even competitors with conventional telecommunication networks. For example, some of the new tele-operators include electrical distributors, cable TV operators, Internet providers, wireless services such as LMDS, etc. Originally, these different "nets" each served different purposes, and were not configured to work with each other since their services were in different topical areas. However, given the significant event of deregulation of the telecommunications markets in the United States and in various other countries, it is presently envisioned that a transformation will occur on a global scale regarding the use of "non-conventional" resources to provide communication services. It is presently recognized that while these different services may be available, in order to have a commercially viable system that offers the consumer (i.e., subscriber, with commercially valuable service that truly allows the subscriber to have worldwide communication freedom regardless of where the subscriber presently is and plans to be in the future) point-to-point translators or gateways are being viewed as the solution. According to the configuration shown in FIG. 1, it is up to the different systems themselves to work out the differences in protocols and communication capacities so as to establish communications between the "unconventional" communication providers, if in fact the communications link can be established at all.

In view of the evolution of communication networks in the present deregulation era, the present inventors have recognized that the conventional point-to-point approach towards connecting different networks, will necessarily provide an economic barrier to new services that wish to enter the communications arena, because as each new service comes on line, additional translation and adapter equipment is required for all of the other systems.

As presently recognized, each of the different nets have one feature in common: each net communicates information from one point to the next. When it comes to communicating between different networks, language barriers (protocol differences) present themselves, which must be overcome in order to share the resources available between the different networks. The communication protocols, are not unlike different European languages. For example, more often than not incompatible "native" languages are not an absolute barrier due to the diversity of language skills held by many people. For example, as presently recognized, while it is possible that when one person approaches another person and begins communicating in language A, the second person will instantly be able to understand and converse in that language so that seamless communication may be had. However, often it is the case that when the first person begins communication with the second person in language A, but the second person recognizes that communication is not possible, and tries to respond with language B, hoping that the original speaker will be able to speak language B. Using this ping-pong approach, the two people eventually reach a determination regarding whether or not there is any common language that may be spoken between the two. When a common language is identified, the two may communicate directly, however, if there is no common language between the two, then it will be necessary to use a translator (a third person) in order to allow for the two to speak with each other. The present invention, to some extent, leverages on this concept, and provides a central facility that helps facilitate in a fast and efficient manner different communication protocols that may be common between the two different networks so that those networks may operate in a direct communication mode. However, when communication is not possible the central facility provides an infrastructure for converting between the two languages (a translation function). Furthermore, the central facility helps educate both the first network and the second network, for future communication sessions, by efficiently providing to the different communication networks attributes of specific subscribers and networks that are used in the overall communication system.

SUMMARY OF THE INVENTION

Consistent with the title of the present section, specific attributes of the present invention are described herein. However, the section entitled "Detailed Description of the Preferred Embodiments" provides a more complete listing of the attributes of the present invention.

A goal of the present invention is to address the above-identified limitations with conventional systems and devices.

Another aim of the present invention is to establish a device, system and method that allows for the establishment of communication between different objects (which may be communication networks, or even nodes on the different networks).

Each object is made up of a network (i.e., a "net"). Each of the different objects are different in construction and character, and may incorporate a significant amount of proprietary signaling protocol and attributes. Some of the nets, which will be described herein as networks A–G, in a generic sense, although they also include other nodes or networks, are designated for specific use such as telephony, data communication, power transmission and distribution, video and audio programming distribution such as wired cable TV, wireless-cable, wireless local nets, cellular communication networks and the like. These different networks all have different protocols and thus to each of these networks is included an adapter (herein referred to as adapter H), where the adapters are configured to translate between specific protocols used in the networks and a particular general protocol (i.e., a standard protocol). A centrally located controller, as will be discussed, receives information from the different objects whose centrally arranged control equipment sets up communications between the objects (A–G) and/or use of services or between objects.

The controller 35 includes a router 39 (see e.g., FIG. 2) which is configured to receive information from the different objects to assist in the communication between objects. The controller also includes a database 37 that hosts a list of all the subscribers, their calling numbers in the different objects, and other attributes that may be of interest to the subscribers, for other parties who wish to contact or provide information to those subscribers. The controller 35 uses the database to identify which of the objects a given calling number should be directed. This information is received from the router 39 and transmitted to the database 37, where the database 37 then retrieves the appropriate information regarding which services are identified for a particular subscriber at that time so the controller 35 will be aware of the subscriber's preferred mode of communication at any particular time. The controller 35 also sends control signals to the different objects (the calling party and the called party) so as to set up the service in question. To this end, the centrally based controller 35 facilitates the process for identifying a common protocol, where appropriate, for communication between the two different objects. This system is facilitated in that the database includes information regarding attributes of the different objects.

When a subscriber moves from one network to the next, the database is updated to keep track of the subscriber's current number such that the new number is held in the database regarding the subscriber's current location so that the subscriber may quickly be identified and a preferred protocol may be identified when establishing communications with that particular subscriber. These particular "net numbers" are made up of internal numbers within a respective object and are not released to the public. Consequently, the subscribers need not change subscriber numbers due to a change of a residence or teleoperator such that calling numbers may be arranged to refer to a net number that is associated with the subscriber number. For this purpose, the database includes a list of the subscriber's affiliation to the different objects. The subscriber number that refers to a given net number in one of the objects is guided to another object or net number depending on the subscriber's wish at any given time, for example the time of day, day of the week and who is calling, for example.

The present invention also provides a method for providing a communications session between objects that are made up from different communication networks. The principles employed in the different objects are differentiated from one another based on the object's original information. Moreover, in a world that experiences an ever increasing number of different communications providers, the attributes of different communication providers, including even perhaps a small "mom and pop" communication provider will have unique attributes that will not be well-known to others in the communication industry. Nonetheless, even such small companies and newcomers, in fields far from traditional telephone services, will be able to communicate seamlessly in the present system even though according to conventional principles, such systems may be completely different or incompatible with one another. To this end, a feature of the present invention is that the central control equipment, is available to help facilitate the initial communication and even subsequent communications between the different objects, in attempting to ascertain whether or not a common protocol exists between the two networks, when trying to establish a call or service request. To this end, the controller identifies the objects and categorizes them according to the different working principles employed in the objects and provides a verification that a translation at some part between the two different networks may be carried out in order for a communication session to be established. When the result of these processes is that the communication between the objects is guaranteed as services are accessible within one of the objects resulting in use of connections in another object. To assist in meeting this goal, initially, objects and the controller communicate with one another according to a predetermined protocol.

The phrase "joint protocol", describes a concept of two different communication entities communicating together on a commonly available protocol, which may be object-dependent in some cases. The controller confirms in the case of the object dependency, which protocol the individual objects are capable of using, and then when these objects are able to use a common protocol, assigns that protocol to the different networks so as to allow the networks to communicate directly with each other. However, when a joint protocol is not available, the centrally based controller, has available a router, that is able to translate between available protocols. The central controller also provides a learning capability that updates the adaptors H used in the different objects to assist in implementing the joint protocol in future sessions. Thus when the overall universal communication system is updated and a new communication object comes on line, the adaptation equipment H is updated with the appropriate protocol such that future communication may be facilitated, where possible. When it is not possible to update a particular adapter H for a particular object, perhaps due to significant processing demands, the centrally based controller will assume the function of facilitating the communication between the two different objects.

After an activity is established when connecting different objects, the different objects will then confirm whether or not a particular activity may be accomplished by the adapter H itself or if external assistance is required. When external assistance is required, the central controller is employed to help facilitate the communication by the central controller contacting the objects which attempt to communicate with one another. When necessary, the central controller will actually restructure information from one object to the other such that the objects are able to understand each other and the information is thus allowed to be managed within a respective object. The objects themselves also establish a profile for the different connections between the different objects that define the services to which the subscriber will have access. This profile is stored at the adapters for the different objects, or optionally, leverages off the storage space available within the database at the central unit and stores the information there for a quick retrieval. The objects themselves or the central controller confirms which of the objects will be used in different requested services and which connection paths will be available for the different cases. When determining which links are available, available system capacity for different objects is available and optionally used when considering which connections to establish. To this end, objects, may optionally provide channel loading information to the central controller on a periodic basis so the central controller will have available information regarding the most efficient routing route for establishing connections for different services.

The inventive method, system and apparatus offers numerous advantages, one of which being that the present solution offers an alternative to establishing individual connections between systems when the systems themselves attempt to communicate information therebetween. In this way, the services offered by the different systems may be used jointly, such that traditional users of one object may employ available services from another object so as to increase the flexibility and available routing paths for distributing information to different subscribers. A feature offered by the present invention, is that subscribers themselves will have increased flexibility by being able to transport numbers associated with that subscriber from system to system even though that subscriber may move to a different area code, country, or even terminate subscription to one service and employ an offering made available by another service. Another advantage is that the attributes associated with having a central controller with an accessible database, enables subscribers to preregister and adaptively change particular profiles regarding how and when that particular subscriber would like to receive information distributed from anyone of a variety of different calling services. For example, the subscriber may permit certain types of traffic to be connected to that subscriber's residence at certain times of the day, but route that same type of traffic to the subscriber's work location at other times of the day. Furthermore, a subscriber is thus able to monitor different types of calls in order to allow only certain calling services to get through during certain times and/or certain circumstances. For example, during dinner hours at the subscriber's residence, the subscriber may choose to route all information to a particular service that provides a message recording service rather than any service that presents an audible alarm that might annoy the user during dinner.

The present invention also greatly facilitates the incorporation of new communication services into a seamless information communication system that includes many of the traditional services, as well as new start-up networks.

At least one limitation associated with the system shown in FIG. 1, is that it is difficult for new services 15 to be incorporated, in a cost effective manner, so as to become intercompatible with different communication resources such as those shown in FIG. 1.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 2:
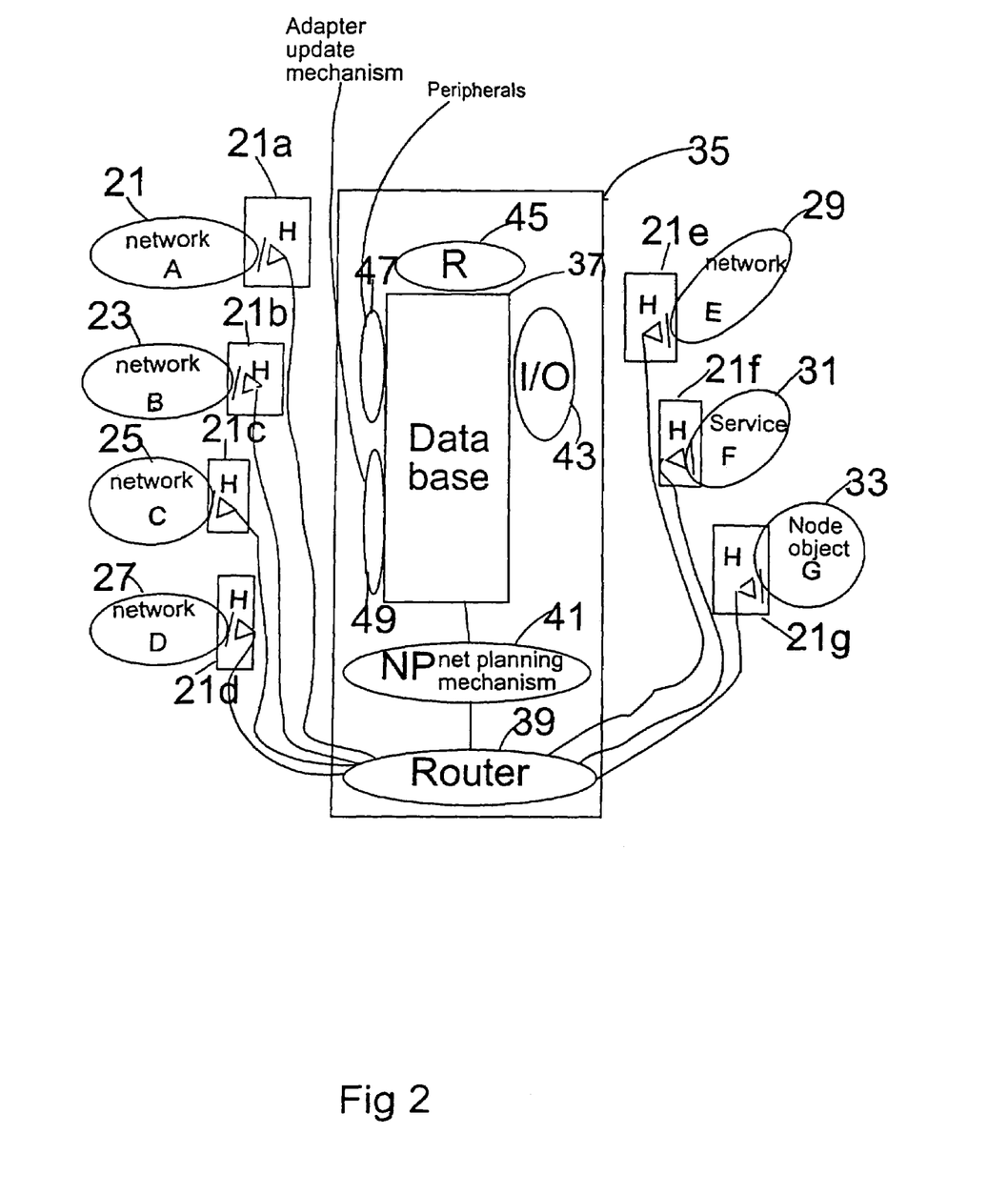
FIG. 2 is a block diagram of a universal, central controller-based communication network that interconnects a variety of existing networks and communication resources according to the present invention.

Referring now to FIG. 2, a system architecture according to the present invention is now described. Objects are referred to herein as being networks and may be the entire network itself, or portions of particular networks or services. These objects are represented as items A–G, objects 21, 23, 25, 27, 29, 31 and 33. Objects 21, 23, 25, 27 and 29 are shown as being different networks, that may include among other things normal telephone systems, such as the public switch telephone network (PSTN), cellular systems, GSM-based communication systems, network management terminal-based systems, personal communication services (PCS) systems and the like. Other objects may be any type of system that provides communication resources by which different subscribers may be accessed, or equipment or services employed by the subscriber may be accessible. Such services are represented as service F 31 in FIG. 2 and includes local area networks, cable TV systems, wireless local-loop systems, electrical distribution networks with communication resources, wireless networks and the like. In addition, particular objects of a node represented as item G 33 in FIG. 2, may be particular individual resources for the different networks 21, 23, 25, 27, 29 or services 31. More particularly, the node G 33 may be a particular terminal or even be a subscriber terminal or a piece of equipment employed with an existing network, in contrast to the different networks 21, 23, 25, 27, 29 and 31, where generally the adapters 21a–21g, are arranged at switching facilities within the network, central controllers within the networks, or at locations other than specific subscriber-level nodes in the network. Moreover, the different adapters included in FIG. 2, are not to be construed so restrictively as being limited necessarily to being located only at the core routing hub, or switching facilities in the different networks, but also may be located at particular nodes, such as subscriber-nodes, on the network itself. According to such an architecture, particularly flexible systems are developed.

Generally, the different objects 21, 23, 25, 27, 29, 31 and 33, employ incompatible protocols when it comes to communicating between the different objects. One aspect of the incompatibility, is the addressing principles that are employed in the different networks as well as the protocols employed thereby.

The system shown in FIG. 2, employs the central controller 35 that contains therein a protocol coordination mechanism 45, database 37, network planning mechanism 41 and router 39. Peripheral equipment 47 and an adapter update mechanism 49, are components of the central controller 35 that help facilitate managing connections between the different objects 21–33. While a single database is shown, and a single central controller 35 is shown, certainly the database 37 and controller 35, may include parallel processing architectures with parallel resources available so as to facilitate the communications between objects 21–33. Furthermore, the router 39, may be a set of routers located in a single location, or even a distributed architecture with routers that are interconnected amongst each other in a more diversified application. When the central controller 35 includes multiple components located in geographically distributed areas, the different components of the central controller 35 are connected to one another by way of an internal communication network for efficiently exchanging information between the different components of the central controller 35. Nonetheless, for simplicity sake in describing the structure shown in FIG. 2, a single central controller 35 is shown with the single database 37 and single router 39.

The central controller 35 operates in the following manner. The database 37 is populated with an aggregate list of subscribers who subscribe to services offered by the objects 21–33. Associated with the subscriber information, is at least a subscriber general calling number, that is uniquely associated with each subscriber. The database 37, is a software-based database hosted on a computer readable medium, such as Oracle 8, although other databases such as SQL may be employed as well. When an inter-object communication session is to be established, a calling network, such as object 21, passes a signal through adapter 21a to the central controller 35, indicating that an inter-object communication session is to be established. In the message to the central controller 35, is a message that includes the general calling number for that particular subscriber. A profile for the subscriber is identified in the database 37, and the calling number associated with that particular subscriber, according to the protocol is thus provided back to the adapter 21a for establishing a link with the object associated with that subscriber at the particular point in time. The database 37 will include an indication as to whether or not a common "language" protocol exists between the calling object 21, and the called object, say service F31. When the common language is available, the adapter 21a communicates directly through the router 39 to the adapter 21f according to that common language. The central controller 35 may optionally include an interrogation session between the adapter 21a and adapter 21f to identify particular loading demands on the resources of the different objects so as to determine an efficient communication routing path between the two different objects 21 and 31. On the other hand, when the common protocol is not present between the object 21 and the object 31, the router 39 provides a "translation" function so as to facilitate communications between the two different objects. In this case, the router 39 may employ both internal and external mass memory to provide a buffer with a predetermined capacity so as to hold predetermined amount of the information to be routed to the called subscriber when the communication session is established.

Regarding the different connections between the adapters 21a–21f, any one of a variety of connections may be included, such as a terrestrial-based wired-connection, as well as terrestrial-based radiowave communications using various types of transmission techniques including analog and digital communication, as well as other type of communications and the like, any of which are capable of transporting information from one point to another. The router 39 need not bear the entire burden of translation, because the central controller 35 is familiar with the communication attributes of the adapters 21a and 21f, such that the bulk of the translation work may be performed between the adapters 21a and 21f, by having these adapters perform a predetermined portion of the translation function, reserving the remaining translation to be performed by the router 39.

In many situations, after a predetermined period of time, the adapter update mechanism 49, observes the function performed by the router 39, when facilitating communications between the adapter 21a and 21f. The adapter update mechanism 49 then initiates a communication update session with each of the adapters 21a and 21f, such that the adapters 21a and 21f, are software-upgraded to perform the function performed by the router 39. According, in future communication sessions between the object 21 and the object 31, the adapters 21a and 21f are equipped to perform the entire protocol conversion process without further assistance of the router 39. When this update process has been performed, a record is kept in the database 37, so as to indicate that the adapters 21a and 21f have been updated.

For a more typical inter-object communication session, the object a21 transmits to the subscriber information in a session initiation message. The object 21a passes this information to the adapter 21a in a conventional format employed in the network protocol for resources within object a21. The adapter 21a then converts this message into a generally, agreed-upon form of transmission to the router 39, where the agreed-upon protocol was previously determined in a earlier transaction between object a21 and the central controller 35. The communication then from the adapter 21a to the router 39, includes, according to this protocol, the addressing information regarding that particular subscriber, including the subscriber number for that service.

The router 39 then receives the information from object a21 and forwards the information by way of a planning mechanism 41, so the planning mechanism may monitor the transactions and accesses of the database 37. The central controller 35 then employs the subscriber number in the message sent to the router 39, so that the records for that particular subscriber may be identified within the database 37. Included in this message may include specific services (such as communication capacities, protocols listed in prioritized order, type of communication voice, data, video or the like) so that the central controller 35 may consider this when determining a suitable protocol when arranging for an optimum linkage between the calling object a21 and the called object e29. The database listing will include the functionalities associated with that particular subscriber, including the profile for that particular subscriber, regarding the different objects at which that subscriber will be located for a particular time of the day. For example, the subscriber may for example, require that all communication take place via the subscriber's home number, during certain periods of the day, at work during other times of the day, and to a telecommunication facility at other times of the day or for only a selected list of objects, that employ certain types of receivers (say a car radio for example which receives one-way communication from a satellite service), for example. On the other hand, the central controller 35 may employ an iterative communication linkage verification operation, where according to a priority order set by the subscriber, the central controller 35 will attempt to ascertain whether or not the subscriber is personally available to receive information at that particular time. If the subscriber is not available, perhaps by way of an automated message after a predetermined period of time has elapsed by the subscriber not picking up the communication service, the message may be routed to the next object identified on the subscriber's profile stored on the database.

Once the protocol coordination mechanism 45 in the central controller 35 determines how a particular communication link should be established between the object a21 and the object e29, the protocol coordination mechanism 45 routes a message through the net planning mechanism 41 and router 39 to the object that is being called, in this case object e29, informing the adapter 21e of the protocol that is to be employed in the communication with the adapter 21a associated with the object a21. The object e29 receives the information provided from the protocol coordination mechanism 45 after first having been translated into the native protocol for the object e29 by the adapter 21e. It is at this time that the object e29 provides an update message to the router 39, indicating whether or not the communication link can surely be established. When it is, the router serves as a switch so as to close the link between the adapter 21a and the adapter 21e.

While the structure shown in FIG. 2 provides a mechanism by which communications may be established between terminals in different objects, it is possible that internal communications even within a particular object may be routed through the central controller 35. This may be the case when internal breakdowns occur within a particular object, such that message traffic may be routed through the central controller 35, as an alternative path for establishing communications on an intra-object basis.

The protocol coordination mechanism 45 keeps track of the different protocols employed by the different objects 21–33 and includes a mechanism for comparing the communication attributes between the different protocols. Thus, the protocol coordination mechanism 45, upon receiving a particular request for establishing a communication link between one object and another, may rapidly analyze the candidate protocols (i.e., the languages that are common to the different objects) and determine the most effective protocol to which to direct the different adapters used by the objects for making the communication link. In conditions where an exact overlapping language is not available, the protocol coordination mechanism 45 will identify the protocols that are within the vocabulary of the different objects under consideration, so that the resulting protocols employed during the communication session, places the minimum translation burden on the router 39. Conditions considered by the protocol coordination mechanism 45 include among other things, whether special requirements are needed when translating between the different protocols (such as one way or two way communication) which types of communications are allowed in the respective objects (asynchronous, synchronous communications at predetermined gradations of data rate) and how traffic is to be routed through an object that is not directly affected by a communication session. For example, it is possible that the object is merely a distribution system where the communication link back to that communication system is through a central controller, that only has predetermined times which it can receive information. Accordingly, in that situation the protocol coordination mechanism 45 would identify that a store-and-forward communication link needs to be established, where the burden is placed either on the router 39 or the respective adapter for that particular object or a combination of the two.

The net planning mechanism 41 is in one embodiment connected between the router 39 and the database 37. However, connections between the router 39 and the database 37 may be made directly, or through input/output device 43, which may serve as a common bus between all the components contained within the central controller 35. Generally, this net planning mechanism 41 oversees communications between the different objects, and internally between the protocol coordination mechanism, database 37, peripherals 47 which provide updates to the database 37 when required during a maintenance action or updating of the database files from a local location, as well as the adapter update mechanism 49. The net planning mechanism 41, facilitates the coordination between the adapter of the calling service and the adapter of the called service, when determining whether or not services are available between the adapters for establishing a communication link, and consulting with the protocol coordination mechanism 45 when identifying the optimum protocol for the available services for both the calling object and the called object. The net planning mechanism 41, may also direct a change in the agreed-upon protocol during a communication session, when loading changes occur in the different objects.

Accordingly, when error events occur or significant loading events occur on particular objects or communication resources used by the objects, the net planning mechanism 41 is able to redistribute the information flow from one object to the next, based on the most efficient use of system resources. In some events this will require the rerouting of information, the establishment of a new protocol to be used between the objects, or even the inclusion of a third or more object, as part of the rerouting of the information. The net planning mechanism 41 may also be distributed amongst different geographic locations, as is the case with the database 37 and the central controller 35, with links established between the different components of the net planning mechanism 41. In this case, as long as the net planning mechanism 41 and protocol coordination mechanism 45 have access to the different components of the database 37, the system is configured to be "self-healing" if various component parts of the network planning mechanism 41, database 37 and protocol coordination mechanism 45 fail during the normal course of events. In such situations, the database 37, replicates itself through dedicated communication lines, or alternatively other communication links, so that redundant copies of the information stored in one of the components of the database 37, may be found in another database at a geographically distinct location. Thus, the overall system reliability and maintainability is facilitated by the avoidance of mission-critical failures occurring within any one particular hardware-resource. In events where protocols are changed, or an error occurs in one of the other objects, the database 37 may receive a portion of the information itself, and save the same as part of a store-and-forward communication link so as to avoid disruptions in the communication and the potential loss of information.

Turning now to an example implementation of the present method, and in particular, when a new communication provider is connected to the system shown in FIG. 2, suppose a new customer, i.e., a subscriber, signs an agreement with an operator acting as a communication provider, for example a telecommunication provider regarding services to be accessible for that particular subscription. The subscription is given a calling number that is used by others to call that particular subscriber according to that subscription within the network for which the subscriber has obtained a subscription. The operator registers this selected service and records those services that can be implemented from the operator's network and which the services are implementable through cooperation with other operators. With this information, a profile for that particular subscriber is set up and stored in the system which the subscriber receives as a home address. In this manner, a customer uses the resources for that particular telecommunication network, but also has access to services that are offered subscribers in other services. For example, the different objects 21 through 33 in FIG. 2, may provide different types of telecommunication networks in this regard that are operated by different types of operators, which may include telecommunication networks, data networks, mobile telephone networks and the like. By agreement between the different operators, regulations are optionally determined for transmitting traffic therebetween, for example, by use of joint protocols, sharing of economic benefits, choice of routing, and in special cases, allocation of particular channels, frequencies and the like. The subscribers may be assigned additional numbers associated with that particular subscriber that unequivocally identify the subscriber's different connections. In this context, all the different connections refer back to the particular subscriber who has been assigned that particular number such that communications from mobile telephones, fixed telephones, facsimile transmissions, data subscriptions and the like can be routed to that particular subscriber. The different numbers, logic numbers, associated with that particular subscriber, are associated in the database 37, with a "net number" that is provided to the object when the subscription is activated. Additionally, the subscriber is allowed to use different services depending on which of the subscriptions is used and which of the nets are involved. However, subscribers may wish to make increased use of services that do not belong to that particular service provider, but rather are resources of other providers (for example such as a paging function or the like).

The central controller 35 employs the database 37, as a mechanism for hosting the relationship between that particular subscriber and the various logic numbers assigned to that subscriber. Each of the logic numbers are associated with one or several net numbers for communicating with one or several of the different objects.

When a call is initiated to the subscriber, the central controller 35 identifies the type of communication that is being requested, and what the potential alternatives exist for establishing that connection to the other object. When determining the type of connection to be established, the profile associated with the particular subscriber, is accessed from the database and determined in priority order which of the different potential objects and locations associated with that subscriber should be first attempted, according to time of day, day of the week, and particular recognition of a subscriber's location at any given moment. When a call is established, the calling object indicates the subscriber's logic number. This logic number is then transmitted to the central controller 35 with a request for connection and instructions as to the preferred communication path. The central controller 35 then interprets the logic number and associates that logic number with the subscriber's records in the database 37. The records in the database 37 will indicate the operator and the object which the connection is to be made. In the central controller 35 additional conditions are monitored for establishing communications and the routes by which the connection will be executed, which net/operators (objects) will enter into the connection. The different objects then receive information from the central controller 35, regarding how the adapters associated with each of the objects, should convert the native protocol for that particular object into a mutually agreeable protocol so as to establish a direct connection through the router 39 to the other object, or so as to invoke a protocol that is as close as possible, as determined by the protocol coordination mechanism 45, so that the burden placed on the router 39 for translating between the protocol employed by the adapter for the calling object, is as close as feasible to the protocol employed by the called object. If it is determined that a direct connection between the two different objects is possible, optionally, a mutually agreeable communication path, that excludes the router may be invoked. The protocol coordination mechanism 45, monitors the respective subscriber profile stored in the database 37, for the purpose of establishing which services are available and usable for that particular called subscriber during the communication and also for determining whether or not any of the services to which the parties have access may create conflicts. Based on the results of the monitoring operation, the net planning mechanism 45, in the central controller 35, will be avoided, until a mutually agreeable communication link can be established. The choice of connection through which the communications will be carried out also occurs with reference to the profile for the particular subscriber stored in the database 37. This connection may, for example, depend on the time of day, who is calling, the type of communication requested, etc.

In normal operation, when incompatible objects are the subject of a communication session, the central controller 35 is interjected in the link so as to provide a direct connection to the called object by way of the router 39 and the respective adapters associated with the calling object and the called object. In this situation, the calling object sends a query to the central controller 35 via a predetermined protocol, after which the central controller 35 consults with the database 37 and determines which services are needed. The central controller 35 then determines which objects are to be activated, and consults with the object to be activated so as to assure a link can be established at that particular time, and once confirming the same, establishes the connection. When the connection is established, the central controller 35 informs the adapters associated with the calling object and the called object to communicate using a certain predetermined protocol, and only if necessary, is the router 39 interjected for performing an active translation role between the protocol employed by the calling object and the protocol employed by the called object.

Figure 3:
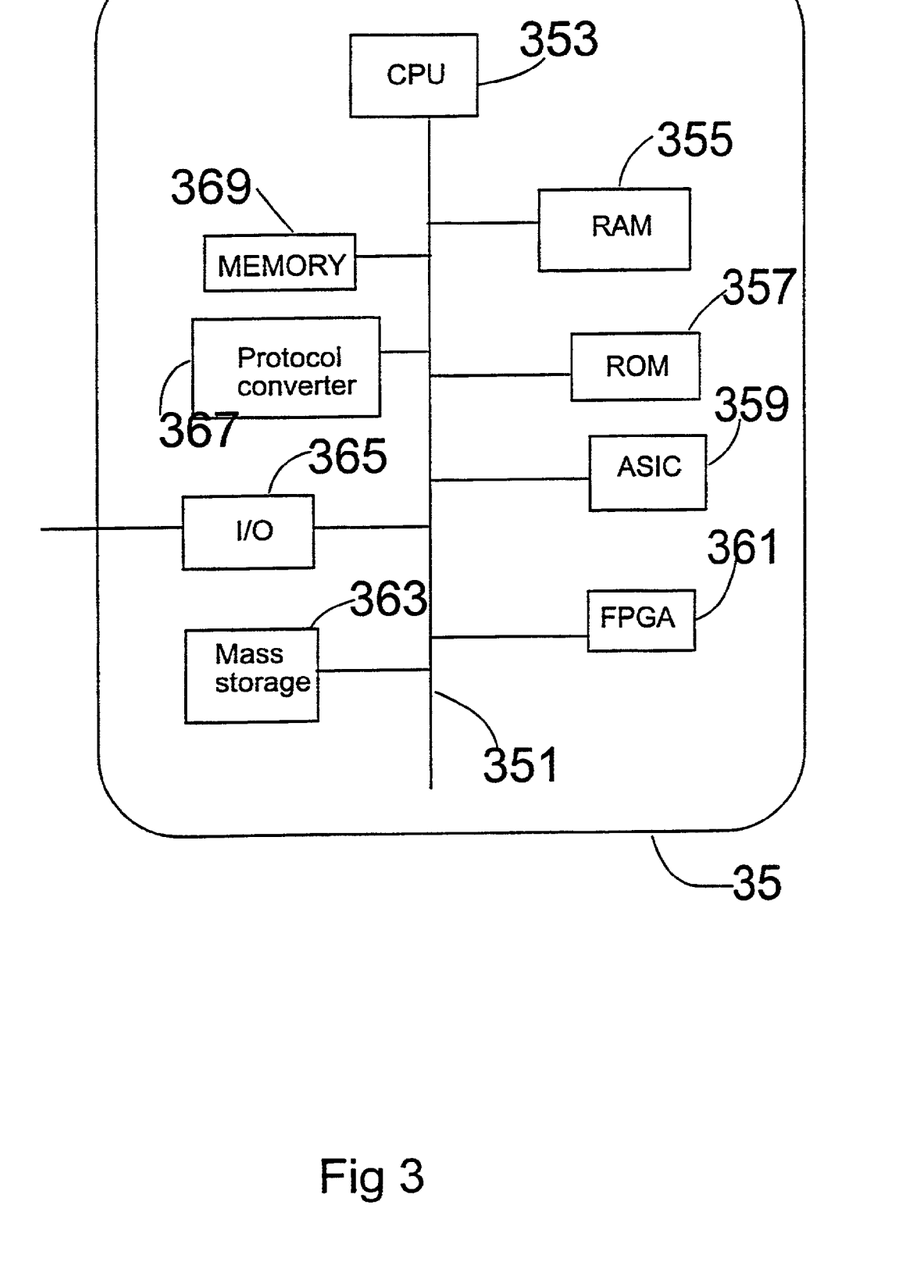
FIG. 3 is a block diagram of a processor portion of a central controller according to the present invention.

FIG. 3 is a block diagram of the central controller 35. A system bus 351 interconnects a central processing unit (CPU) 353 which provides the processing infrastructure for the software implemented central controller. The CPU 353 communicates over the system bus 351 with ROM 357 and RAM 355 which provide permanent and read/writeable memory capacity respectively. The ROM 357 is field-writeable such that changes in the application software for implementing the protocol coordination mechanism 45 (FIG. 2) net planning mechanism 41 (FIG. 2) and router functions 39 (FIG. 2), are implemented. While the respective mechanisms shown in FIG. 2 within the central controller 35 are predominantly operated in software on the CPU 353, processing resources may also be implemented using hardware implementations in the form of an application specific integrated circuit (ASIC) 359 and field programmable gate array (FPGA) 361 which also connect to the system bus 351. The database 37 (FIG. 2) is hosted on mass storage medium 363 which may be magnetic memory, optical memory or the like. While a single CPU 355 is shown to be the single processor that coordinates reading and writing operation on the mass storage 363, other processors may also populate the system bus 351, and as an alternative embodiment a separate processor is dedicated for the information retrieval and searching operations for the database implemented on the mass storage medium 353. An input/output controller 365 connects to the system bus 351, as well as a protocol converter mechanism 367 and memory 369. The protocol converter 367 and memory 369 implement a portion of the router 39 (FIG. 2) for assisting and facilitating the translation operation when communication between two objects uses an incompatible protocol such that a translation operation is performed in the router 39 (FIG. 2), which is implemented largely in the protocol converter 367 with associated memory 369 and I/O controller 365. The protocol converter 367 may itself include a separate processor or processors to implement the router functions. The I/O controller 365 governs information and message traffic between the central controller 35 and external objects, in addition to the communications with local peripherals 47 (FIG. 2).

Figure 4:
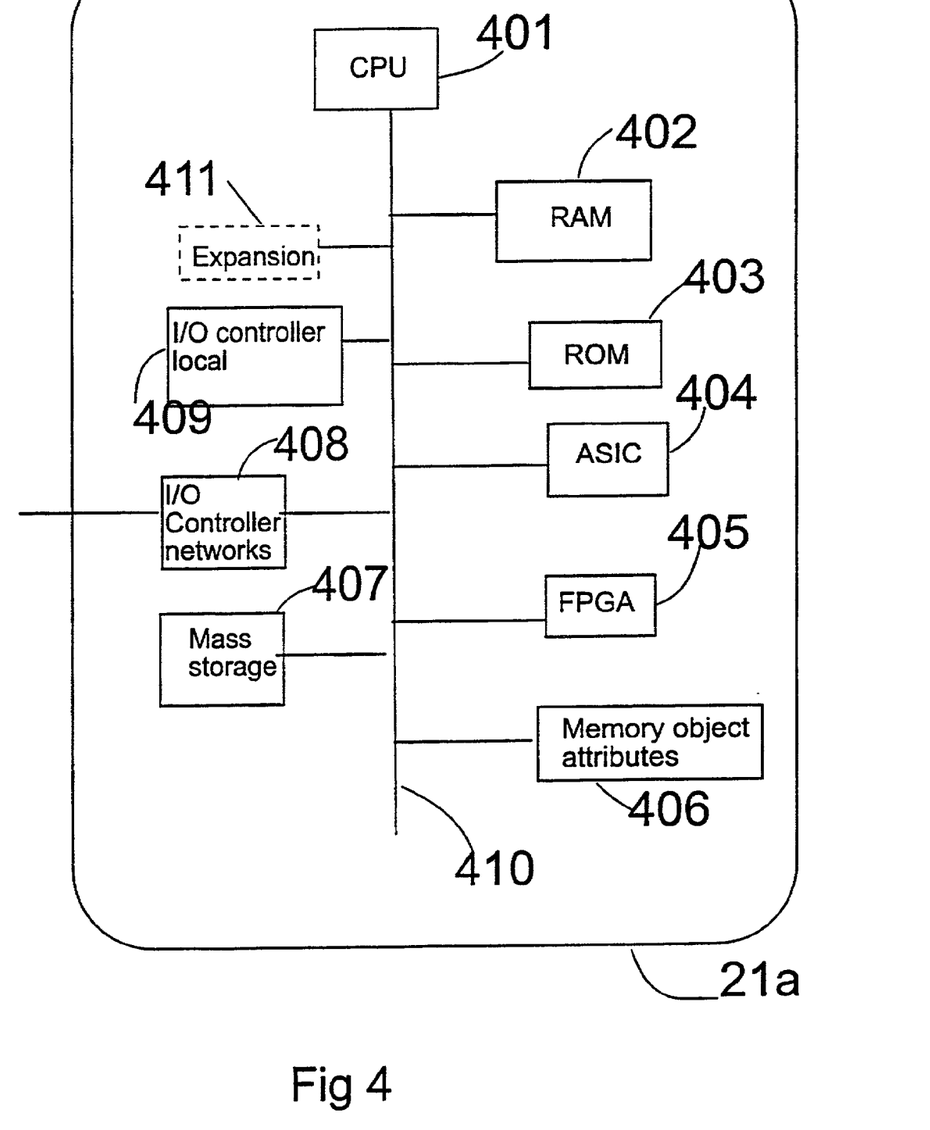
FIG. 4 is a block diagram of an adapter used in an existing object according to the present invention.

FIG. 4 is a block diagram of components employed in one embodiment of the adapter 21a (FIG. 2). Much of the structure included for the adapter 21a is similar to that shown for the central controller 35 of FIG. 3, albeit components being of a lesser scale regarding throughput demands when implemented on a system-wide level. A system bus 410 interconnects a CPU 401, RAM 402, ROM 403, ASIC 404 and FPGA 405 as shown. The CPU 401 implements the protocol conversion operation, based on application software saved on the ROM 403. RAM 402 serves as buffer memory as well as temporary storage for retaining control parameters directed by the central controller 35 (FIG. 2) when establishing an optimum protocol for communication during a communication session. ASIC 404 and FPGA 405 assist the CPU 401 in performing special purpose operations. Mass storage device 407 serves as a message buffer, when the communication data rate for the object 21 (FIG. 2) to another object operates at a different data rate. In this case, the mass storage 407 serves as a buffer, so as to provide a mechanism by which communications may occur with relatively seamless restraint on the usability of the system from a subscriber's perspective. I/O controller 48 serves as a connection to the central controller 35, as well as other objects when direct connections are approved by the central controller 35. The I/O controller 409 serves as a local interface with the object 21. The adapter 21a includes expansion room 411, for accommodating additional processor resources so as to allow for sufficient processor resources when additional communication services come on line and the amount of translation services are shifted from the central router in the central controller 35 to the adapter 21a.

Figure 5:
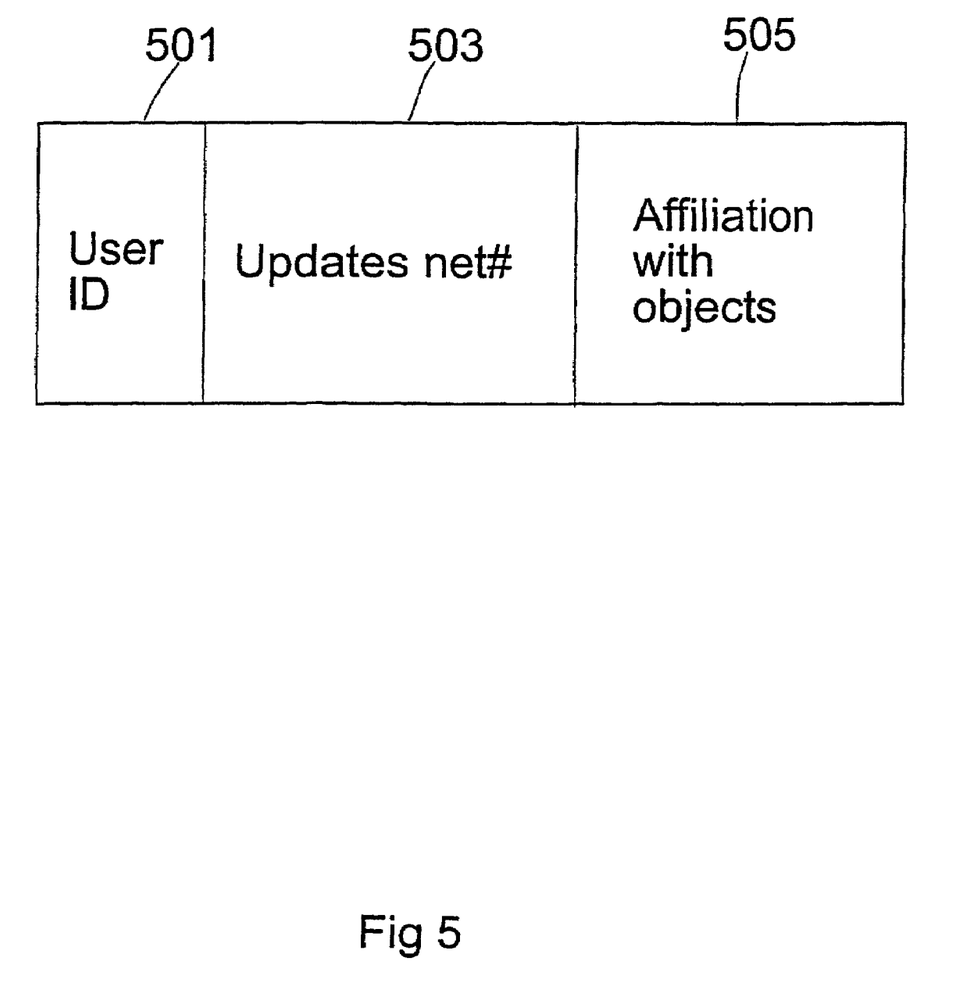
FIG. 5 is a data structure of a word employed in a joint-protocol between an existing network and a central controller according to the present invention.

FIG. 5 shows a data structure for a user profile stored in the database 37 (FIG. 2). The exemplary data structure includes three data fields (which may be stored in separate entries in the database, but are nonetheless associated with one another). Data field 501 includes information regarding the particular user's identification. Included with the user ID is billing information, personal information regarding user name and the like. In addition, the user ID will include the subscriber-specific information such as the subscriber number which is uniquely associated with that particular subscriber. Field 503 includes an updated net number, which is a specific number at which the subscriber may be located at a particular time, either as identified by the user profile also saved in the database (in field 505 as will be discussed), or by way of subscriber-specific registration, when the subscriber knows that the subscriber will be deviating from the normal pre-programmed schedule previously stored in the database. The updated net number is quickly identified in the database as being the location at which the central controller 35 will attempt to reach that particular subscriber when establishing a communication session. Data field 505 includes particular affiliations associated with a given object for that particular subscriber. In other words, the data field 505 (which may be more than one word in the database entry) includes schedule for a particular subscriber including associations with the different net numbers for the subscriber according to those particular time frames, as well as protocol attributes associated with the different objects which the subscriber is associated with.

Figure 6:
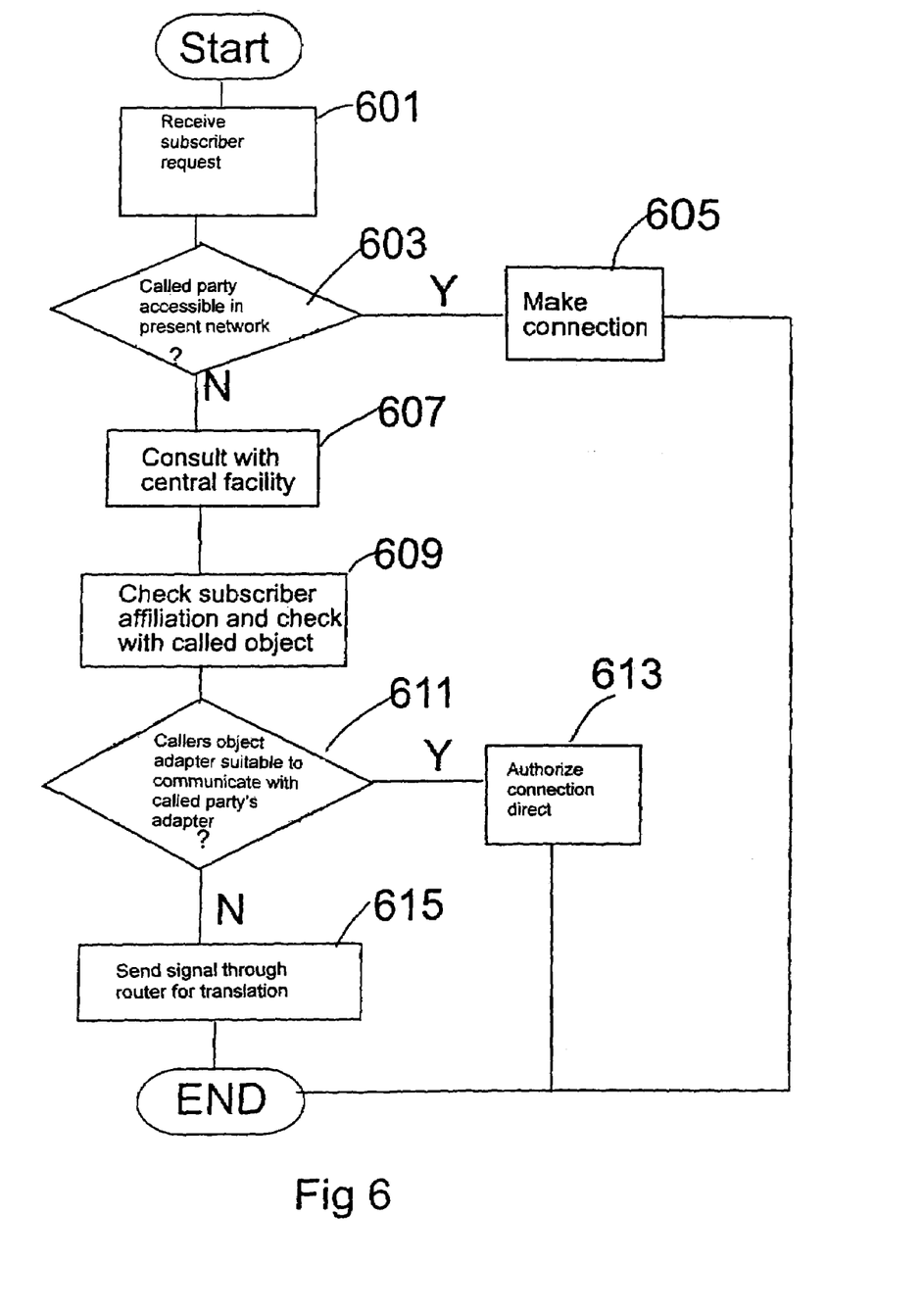
FIG. 6 is a flowchart of a method employed according to the present invention.

FIG. 6 is a flowchart of a method for establishing communications between two objects by way of a central controller. The process begins in step 601, where a subscriber in a first object, requests a call to a particular called party. The process then proceeds to step 603, where an inquiry is made regarding whether the called party is accessible in the present network (object). If the response to the inquiry in step 603 is affirmative, the process proceeds to step 605, where the intra-object connection is made and subsequently the process ends. However, if the response to the inquiry in step 603 is negative, the process proceeds to step 607, where the adapter associated with the calling party's object, consults with the central facility 607 by way of a call using a predetermined protocol previously established between that particular object and the central facility. The process then proceeds to step 609, where the central facility extracts from the message the net number associated with the subscriber who is being called. In this step, the central facility refers to the called party's profile and identifies the candidate locations at which the called party may be located. The central facility then checks with the object identified by the subscriber's profile as being the most likely location where the subscriber will be identified, and determines whether or not a communication session can be established with the called party at that object. The process then proceeds to step 611 where an inquiry is made regarding whether the caller's object has an adapter that is suitable to communicate with the adapter used by the object at which the called party may be contacted. If the response to the inquiry in step 611 is affirmative, the process proceeds to step 613, where the central facility authorizes a direct connection between the adapter for the calling object to the adapter for the called object. The direct connection may be either through the router at the central facility or optionally separate from the router. Subsequently the process ends. However, if the response to the inquiry in step 611 is negative, the process proceeds to step 615 where adapter for the calling object is directed to communicate using a first predetermined protocol, and the adapter for the called object is directed to use a second protocol (where the first and second protocols are deemed by the central facility to demand the minimal amount of translation resources from the central facility) so that the communication link may be established through the router, which provides for the translation from the first protocol to the second protocol. Once the communication session is completed the process then ends.

The mechanism and processes set forth in the present description may be implemented using a conventional general purpose microprocessor(s) programmed according to the teachings in the present specification, as will be appreciated to those skilled in the relevant arts. Appropriate software coding can readily be prepared by skilled programmers based on the teachings in the present disclosure, as will also be apparent to those skilled in the relevant arts.

The present invention thus also includes a computer-based product that may be hosted on a storage medium and include instructions that can be used to program a computer to perform a process in accordance with the present invention. The storage medium may include, but is not limited to, any type of disk including floppy disk, optical disks, CD-ROMs, magneto-optical disks, ROMs, RAMs, EPROMs, EEPROMs, flash memory, magnetic or optical cards, or any type of media suitable for storing electronic instructions.

Obviously, numerous modifications and variations of the present invention are possible in light of the above teachings. It is therefore to be understood that within the scope of the appended claims, the invention may be practiced otherwise than as specifically described herein.

The present document contains subject matter related to Swedish patent application no. 9803503-3, filed in Sweden on Oct. 14, 1998, the contents of which being incorporated herein by reference.

The invention claimed is:

1. A communication device comprising:
a central controller configured to establish a communication session between a first object and a second object, said first object employing a first communication protocol used in establishing a communication session with said central controller, said first object having a first adapter configured to translate between another communication protocol that is native to said first object and said first communication protocol, said second object having a second adapter, said second object employing a second communication protocol that is not compatible with said another communication protocol, wherein:
said central controller includes a protocol coordination mechanism that compares attributes of different protocols supported by said first adapter and said second adapter when establishing said communication session between said first object and said second object;
said central controller includes a database having a list of subscribers with associated calling numbers, said database hosting information associated with said calling numbers for different objects to which said subscribers belong;
said first object is one of a mobile telephone network, a wire-based telecommunication network, a cable television network, an Ethernet, or an electrical distribution network; and
wherein when an exactly overlapping language is not available, said protocol coordination mechanism identifies protocols that are within a vocabulary of said first object and said second object by analyzing which types of communication are allowed in the first object and the second object and how traffic of the communication session is to be routed through the first object and the second object, and selects a protocol that minimizes a translation burden to a router based on a result of the analyzing.

2. The device according to claim 1, wherein the router is included in said central controller, the router configured to receive information from said first adapter and to coordinate said communication session between said first object and said second object.

3. The device according to claim 1, wherein the router is included in said central controller, the router configured to provide an interface between said first adapter and said second adapter, wherein
said central controller is configured to access information in said database regarding services to be invoked when establishing said communication session between said first object and said second object and sending from said router control signals to at least one of the first adapter and the second adapter so as to establish a protocol to be employed by said first adapter and said second adapter when communicating during said communication session.

4. The device according to claim 1, wherein:
entries in said list of subscribers in said database are changed when said central controller is notified of a subscriber moving from one object affiliation to another; and
new information associated with a movement of a subscriber, is used to establish said communication session at a present object associated with said subscriber such that a change in calling numbers by said first object is not required in order to establish said communication session with said subscriber.

5. The device according to claim 1, wherein said database includes entries that associate various calling numbers for a particular subscriber with an object and a net number for said particular subscriber.

6. The device according to claim 5, wherein said database is configured to associate one calling number included in a call request for a specific subscriber with a net number and another calling number at which said specific subscriber is available.

7. A communication system, comprising:

a first adapter configured to translate between a first native protocol used in a first object and a general protocol;

a central controller configured to communicate with said first adapter using said general protocol; and a second adapter configured to establish a coordination session between said central controller and a second object, said second object employing a second native protocol that is not compatible with said first native protocol, wherein:

said central controller is configured to establish a communication link between said first object and said second object;

said central controller includes a protocol coordination mechanism that compares attributes of different protocols supported by said first adapter and said second adapter;

said central controller includes a database having a list of subscribers with associated calling numbers, said database hosting information associated with said calling numbers that includes different objects to which said subscribers belong;

said first object is one of a mobile telephone network, a wire-based telecommunication network, a cable television network, an Ethernet, or an electrical distribution network; and wherein when an exactly overlapping language is not available, said protocol coordination mechanism identifies protocols that are within a vocabulary of said first object and said second object by analyzing which types of communication are allowed in the first object and the second object and how traffic of a communication session is to be routed through the first object and the second object, and selects a protocol that minimizes a translation burden to a router based on a result of the analyzing.

8. The system according to claim 7, wherein the router is included in said central controller, the router configured to receive information from said first adapter and to coordinate said communication session between said first object and said second object.

9. The system according to claim 7, wherein the router is included in said central controller, the router configured to provide an interface between said first adapter and said second adapter, wherein:

said central controller is configured to access information in said database regarding services to be invoked when establishing said communication session between said first object and said second object and sending from said router control signals to at least one of said first adapter and said second adapter so as to establish a protocol to be employed by said first adapter and said second adapter when communicating during said communication session.

10. The system according to claim 7, wherein:

entries in said list of subscribers are changed when said central controller is notified of a subscriber moving from one object affiliation to another; and new information associated with a movement of said subscriber is used to establish said communication session at a present object associated with said subscriber such that a change in calling numbers by said first object is not required in order to establish said communication session with said subscriber.

11. The system according to claim 7, wherein said database includes entries that associate various calling numbers for a particular subscriber with an object and a net number for said particular subscriber.

12. The system according to claim 7, wherein said database is configured to associate one calling number included in a call request for a specific subscriber with a net number and another calling number at which said specific subscriber is available.

13. A method for communicating between objects employing incompatible communication protocols, comprising:

sending coordination information from a first adapter associated with a first object to a central controller;

translating at said first adapter information formatted in a first native protocol used in a first object to a general protocol;

receiving said coordination information at a central controller;

identifying and comparing at said central controller communication attributes of said first adapter and said first object and attributes associated with a second object having associated therewith a second adapter and a second native protocol that is not compatible with said first native protocol;

coordinating between said central controller, said first adapter, and said second adapter including:

translating information sent from said first object in said native protocol; and receiving said information at said second object in said second native protocol;

wherein, when an exact overlapping language is not available, said identifying and comparing comprises identifying protocols that are within a vocabulary of said first object and said second object by analyzing which types of communication are allowed in the first object and the second object and how traffic of a communication session is to be routed through the first object and the second object, and selecting a protocol that minimizes a translation burden to a router based on a result of the analyzing.

14. The method according to claim 13, wherein:

said sending and said receiving include sending said coordination information and receiving said coordination information when said coordinating information is formatted in a predetermined protocol that is different from said first native protocol; and said coordinating includes establishing at said central controller whether said first adapter and said second adapter perform said step of translating information exclusively and determining whether an intermediate translating step is required.

15. The method according to claim 13 wherein said coordinating includes directing said first adapter and said second adapter to translate said information into a predetermined protocol that is different from said first native protocol and said second native protocol.

16. The method according to claim 15, wherein said translating includes translating said information exclusively in said first adapter and said second adapter, and not in said central controller.

17. The method according to claim 13, further comprising:

determining whether an activity in said first object requires communication outside of said first object and initiating said sending step when said activity takes place outside of said first object.

18. The method according to claim 17, wherein:
said coordinating includes contacting said second object and translating said information into a format supported by said second adapter for translating said format into said second native protocol.

19. The method according to claim 13, further comprising:
establishing a profile for a connection for a communication session between said first object and said second object so as to streamline future coordination for future communication sessions.

20. The method according to claim 19, wherein:
said first object establishes a second object in which services for the communication session will be used.

21. The method according to claim 13, wherein:
said coordinating is performed in a protocol coordination mechanism that handles and registers rules and conditions for communicating between said first object and said second object.

22. The method according to claim 21, further comprising:
establishing at said protocol coordination mechanism a service to be used according to a user profile stored in a database associated with a connection to be made.

23. The method according to claim 22, wherein said coordinating includes identifying specific rules for each of said first object and said second object.

24. The method according to claim 15, wherein:
said coordinating includes indicating conditions for linking said first object and said second object by considering available factors including at least one of required channel distributions, requisite protocol translation operations, and cost in income distribution between said first object and said second object.

25. The method according to claim 24, wherein said coordinating includes registering agreements and conditions that are mutually agreed upon by said first object and said second object.

26. The method according to claim 13, wherein:
said receiving includes receiving said coordination information at said central controller; and
said central controller is accessible to each object for other objects in addition to said first object and said second object.

27. A system for communicating between objects employing incompatible communication protocols, comprising:
means for preparing coordination information at a first adapter associated with a first object, including means for translating information formatted in a first native protocol used in said first object to a general protocol;
central controller means for receiving said coordination information and identifying and comparing communication attributes of said first adapter and said first object and attributes associated with a second object having associated therewith a second adapter and a second native protocol that is not compatible with said first native protocol; and
means for coordinating translation of information sent from said first object in said first native protocol, and receiving said information at said second object in said second native protocol; wherein
when an exactly overlapping language is not available, said central controller means identifies protocols that are within a vocabulary of said first object and said second object by analyzing which types of communication are allowed in the first object and the second object and how traffic of a communication session is to be routed through the first object and the second object, and selects a protocol that minimizes a translation burden to a routing means based on a result of the analyzing.

28. The device according to claim 1, wherein said protocol coordination mechanism determines how a particular communication link should be established between said first object and said second object.

29. The device according to claim 1, wherein said protocol coordination mechanism analyzes candidate protocols and determines a most effective protocol for establishing said communication session.

30. The system according to claim 7, wherein said protocol coordination mechanism determines how a particular communication link should be established between said first object and said second object.

31. The system according to claim 7, wherein said protocol coordination mechanism analyzes candidate protocols and determines a most effective protocol for establishing said communication session.

32. The method according to claim 13, wherein said identifying and comparing comprises determining how a particular communication link should be established between said first object and said second object.

33. The method according to claim 13, wherein said identifying and comparing comprises analyzing candidate protocols and determining a most effective protocol for establishing a communication session.

34. The device according to claim 1, wherein the types of communication include an asynchronous communication, synchronous communication, and predetermined gradations of data rate.

35. The system according to claim 7, wherein the types of communication include an asynchronous communication, synchronous communication, and predetermined gradations of data rate.

36. The method according to claim 13, wherein the types of communication include an asynchronous communication, synchronous communication, and predetermined gradations of data rate.

37. The system according to claim 27, wherein the types of communication include an asynchronous communication, synchronous communication, and predetermined gradations of data rate.

* * * * *